No. 838,070.  PATENTED DEC. 11, 1906.
V. E. BEAUCHEMIN.
VEHICLE WHEEL.
APPLICATION FILED NOV. 16, 1905.
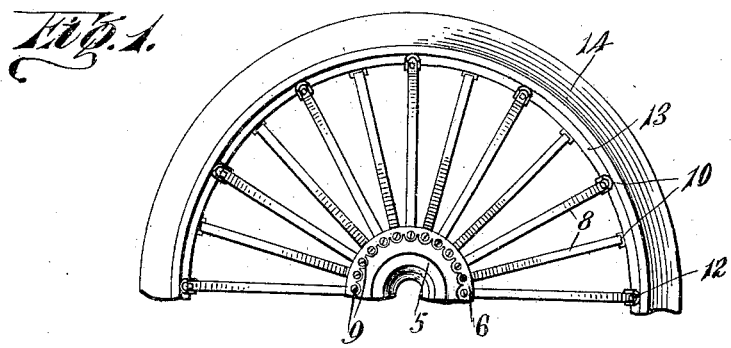
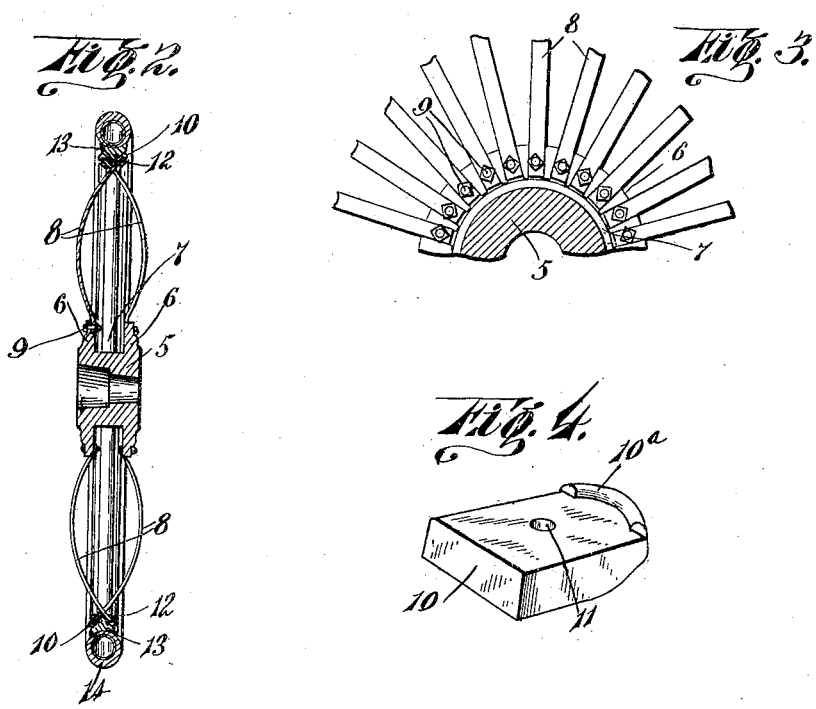
Witnesses:
Eugene McHinry
C. C. Cousins
Victor E. Beauchemin,
Inventor,
By Marion & Marion
Attorneys

UNITED STATES PATENT OFFICE.

VICTOR EMANUEL BEAUCHEMIN, OF SOREL, QUEBEC, CANADA.

VEHICLE-WHEEL.

No. 838,070. Specification of Letters Patent. Patented Dec. 11, 1906.

Application filed November 16, 1905. Serial No. 287,567.

*To all whom it may concern:*

Be it known that I, VICTOR EMANUEL BEAUCHEMIN, a subject of the King of Great Britain, residing at Sorel, in the county of Richelieu, Province of Quebec, Canada, have invented certain new and useful Improvements in Vehicle-Wheels; and I do hereby declare that the following is a full, clear, and exact description of the invention, such as will enable others skilled in the art to which it appertains to make and use the same.

My invention relates to vehicle-wheels.

The object of my invention is to provide a wheel in which the spokes are resilient.

A further object of my invention is to provide an improved means for maintaining the ends of the spokes in position; and my invention consists of the construction, combination, and arrangement of parts as herein described, illustrated, and claimed.

In the accompanying drawings, forming part of this application, I have illustrated one form of embodiment of my invention in which similar reference characters designate corresponding parts, and in which—

Figure 1 is a side elevation of the upper half of a wheel. Fig. 2 is a central vertical section through a wheel. Fig. 3 is a central vertical section through the hub of a wheel, taken transversely to the axle, the spokes being shown as if the rim were removed; and Fig. 4 is a perspective view of one of the spoke-retaining blocks.

Referring to the drawings, 5 designates a hub, provided with annular flanges 6, leaving a channel 7. Disposed in the channel 7 are the inner ends of the outwardly-bowed resilient spokes 8, suitable bolts 9 being used to secure the said inner ends of the spokes to the inner faces of the flanges 6.

The outer ends of the spokes 8 are disposed on the blocks 10, which blocks are provided with openings 11, adapted to receive the bolts 12, said bolts 12 being adapted to secure the outer ends of the spokes on the blocks 10 and to secure the blocks to the rim 13.

The blocks 10 are provided with seats formed by the semicircular flange 10ª on one face of the blocks 10 at one end thereof. This semicircular flange permits a slight movement of the ends of the spokes 8, which are formed to fit the flanges.

In assembling the wheel the spokes 8 have their outer ends disposed alternately on opposite sides of the rim 13.

A suitable tire 14 of ordinary construction is placed on the outer face of the rim 13.

Having thus fully described my invention, what I claim as new, and desire to secure by Letters Patent, is—

1. In a vehicle-wheel, the combination comprising a flanged hub, resilient spokes bowed outwardly, alternately on each side of said wheel and secured to the flanges, a rim secured to the outer ends of the spokes, said outer ends being disposed alternately on opposite sides of the rim, and a tire secured on the rim.

2. In a vehicle-wheel, the combination comprising a hub, resilient spokes alternately bowed outwardly on each side of said wheel and having their inner ends secured to the hub, a block adapted to receive the outer end of each of said spokes, a rim, and a plurality of bolts adapted to secure the blocks and the outer ends of the spokes to the rim on each side thereof alternately.

3. In a vehicle-wheel, the combination comprising a hub, a rim, and a plurality of resilient spokes having their inner ends secured to the hub, a plurality of blocks provided with openings therein and provided with flanged seats, and bolts disposed through the outer ends of the spokes and through the openings in the blocks and adapted to secure said blocks and said spokes alternately to opposite sides of the rim.

4. In a vehicle-wheel, the combination comprising a hub, a rim, and a plurality of resilient spokes having their inner ends secured to the hub, a plurality of blocks provided with openings therein and provided with semicircular flanged seats, and bolts disposed through the outer ends of the spokes and through the openings in the blocks and adapted to secure said blocks and said spokes alternately to opposite sides of the rim.

In witness whereof I have hereunto set my hand in the presence of two witnesses.

VICTOR EMANUEL BEAUCHEMIN.

Witnesses:
J. E. LENICAL,
R. NADEAU.